Oct. 1, 1974 R. L. CADE Re. 28,183

POWDER CLOUD XEROGRAPHIC DEVELOPMENT APPARATUS

Original Filed March 16, 1970

INVENTOR.
RONALD L. CADE,
By Joseph Hirsch
ATTORNEY.

United States Patent Office

Re. 28,183
Reissued Oct. 1, 1974

28,183
POWDER CLOUD XEROGRAPHIC DEVELOPMENT APPARATUS

Ronald L. Cade, Fairport, N.Y., by Xerox Corporation, Rochester, N.Y., assignee

Original No. 3,648,901, dated Mar. 14, 1972, Ser. No. 19,894, Mar. 16, 1970. Application for reissue Nov. 20, 1972, Ser. No. 308,083
Int. Cl. G03g *15/08*
U.S. Cl. 222—194 1 Claim

Matter enclosed in heavy brackets [ ] appears in the original patent but forms no part of this reissue specification; matter printed in italics indicates the additions made by reissue.

ABSTRACT OF THE DISCLOSURE

A powder cloud generating apparatus suitable for use in the development of latent electrostatic images, which includes a rotating disk-like member having at least one aperture passing therethrough. Porous support means are provided beneath the apertures to retain toner material, metered into the aperture by a doctor or metering blade, within the aperture until such time as it is aspirated therefrom. Each aperture defines a unit charge of toner material which, upon entrainment in the gaseous fluid being drawn through the porous support means, can be accurately metered into the development chamber for presentation to the latent electrostatic image being held and developed therein.

BACKGROUND OF THE INVENTION

This application relates in general to xerography and the development of electrostatic charge patterns. More particularly, this application relates to an apparatus for generating a cloud of toner particles which is subsequently passed over the latent electrostatic image-bearing surface to render visible the latent image.

In the xerographic process as described in Carlson U.S. Pat. No. 2,297,691 a base plate of relatively low electrical resistance, such as metal, having a photoconductive insulating layer coated thereon is electrostatically charged in the dark. The charge coating is then exposed to a light image. The charges leak off rapidly to the base plate in proportion to the intensity of light to which any given area is exposed, the charge being substantially retained in nonexposed areas. After such exposure, the coating is contacted with electroscopic marking particles in the dark. When forming a positive image, these particles adhere to the areas where the electrostatic charges remain whereby there is formed a xerographic powder image corresponding to the latent electrostatic image. The powder image can then be transferred to a sheet of transfer material resulting in a positive print having excellent detail and quality. Alternatively, when the base plate is relatively inexpensive as in the case of paper, it may be desirable to fix the powder image directly to the plate itself and thereby eliminate the image transfer operation.

Two methods of image development (that is, the deposition of powder particles to a latent electrostatic image-bearing surface to render visible the latent image) are in common use. One is described in Walkup U.S. Pat. No. 2,618,551 and is known as cascade development, and is in general use for the development of line copy images. In this technique, the powder is mixed with a granular material and this "two-component developer" is poured or cascaded over the plate surface. The function of the granular material is to improve the flow characteristics of the powder and to produce, on the powder, by triboelectrification, the proper electrical charge so that the powder will be attracted to the latent image. More exactly, the function of the granular material is to provide the mechanical control to the powder, or to carry the powder to an image surface and, simultaneously, to provide almost complete homogeneity of charge polarity.

The other form of development is known as powder cloud development, and is in general use for continuous tone development. In this development technique, a dispersion of electrically charged powder particles in an aeriform fluid is passed adjacent the surface bearing the latent electrostatic image and particles are drawn from the aeriform fluid dispersion to form a powder image on the image-bearing surface. This form of development is disclosed and described in Carlson U.S. Pat. No. 2,221,776 wherein a rotating vane wheel or propeller is used to stir up powder in a chamber, thereby creating a cloud of particles for presentation to the latent electrostatic image. The vane or propeller in that patent may be connected to a terminal of a battery to impart charge to the powder particles.

The art of xerography, as briefly described above, is also amenable to recording X-ray patterns such as might be attained by passing X-rays through a body to be analytically examined. The art of X-ray recording by xerography, generally known as xeroradiography, relates to the recording of X-ray patterns and information by means of materials and devices whose electrical conductivity is altered by the action of X-rays reaching the recording medium. In xeroradiography, the plate or element exposed to X-ray pattern usually comprises a metallic backing sheet having a photoconductive insulating layer or coating, for example vitreous selenium, on one surface thereof. It is conventional to cover or protect the photoconductive coating from ambient light by a slide plate. Usually called a dark slide, spaced from the photoconductive surface. The plate or element is sensitized by applying a uniform electrostatic charge to the coating and thereafter the charge plate is exposed to sensitizing radiation with the object to be examined appropriately interposed between the radiation source and the sensitized plate. Under influence of the X-rays emanating from the source which are differentially absorbed by different areas of the test body, but which readily pass through the dark slide, the coating becomes electrically conductive in those portions reached by the sensitizing radiation, thereby permitting portions of the electrostatic charge thereon to be selectively dissipated. Dissipation of the electrostatic charge is proportional to the amount of radiation absorbed by the test body with greater dissipation occurring in those portions of the coating shaded by less absorptive portions of the object being radiographed. In this manner, an electrostatic latent image of the test body is formed on the photoconductive element. The image may then be made visible with an electroscopic marking material which clings to the electrostatically charged portions of the latent image. Reversal, or negative, prints can also be developed by contacting the latent electrostatic image with marking particles of the same polarity. The xeroradiographic process is disclosed, for example, in Schaffert et al. U.S. Pat. No. 2,666,144.

It has previously been recognized that xeroradiography can be applied in the field of medical diagnostics. For example, the xeroradiographic process when utilized to examine extremities, such as hands and feet, has been characterized as being a valuable diagnostic technique since more information is recorded on the xeroradiogram than is recorded on a corresponding film radiogram.

In recent years, the xeroradiography technique has been utilized in the early detection and diagnosis of breast cancer in women. The process, known as xeromammography, has been described as requiring less radiation than non-screen film radiology, and one which gives greater detail in the mammogram to be reviewed by the radiologist. Additionally, a most important advantage is in the increased ease and speed of interpretation of the xeromammogram. Because they are easier to interpret, and, accordingly, reduce the fatigue on the examining radiologist thereby increasing his overall effectiveness, the technique is believed to have application in screening techniques for the early detection of breast cancer.

Where subtle and minute differences between adjacent portions of the latent electrostatic image contain information which is of diagnostic value to the radiologist, it is most important that these information-containing areas be faithfully reproduced. Accordingly, to obtain the maximum, usable information from a xeroradiogram, a continuous tone development technique, such as powder cloud development, is utilized, whereby all portions of the latent electrostatic image can be properly developed and subtle differences in exposure through adjacent portions of the test body readily distinguished.

In one form of powder cloud generating apparatus, the particulate toner material is entrained or is aspirated from a support surface. For example, in Hayford et al. U.S. Pat. No. 2,862,646 the toner particles are entrained from the surface of a porous member, whereas in Matthews U.S. Pat. No. 2,878,972 the toner particles are aspirated from grooves in the support surface. Such apparatus, though more than adequate for line copy or general xerographic purposes, are not totally satisfactory for medical diagnostic purposes where the latent electrostatic image must be optimally developed. To obtain optimally developed image, the toner particles must be accurately metered so that uniform and highly controlled toner bursts can be presented to the image-bearing surface. With respect to xeroradiography-generated images, toner bursts are needed to allow sufficient quiet time, between such bursts, for the powder cloud so generated to develop the latent electrostatic image under influence of the electrostatic fields within the development chamber. Additionlly, the accurate metering of toner material must be continuously repeatable so subsequent images are not adversely degraded by variations in the amount of toner blown into the development chamber.

OBJECTS OF THE INVENTION

It is, therefore, an object of this invention to provide an improved powder cloud developing apparatus.

It is a further object of the present invention to provide an improved powder cloud developing apparatus which is capable of accurately metering the amount of toner material presented to the image-bearing surface for development.

It is a further object of this invention to provide a powder cloud developing apparatus which defines unit charges of toner material to be aspirated from the toner support surface.

Yet a still further object of the present invention is to provide novel powder cloud generating apparatus capable of repeatedly presenting a unit charge of toner material for aspiration into the development chamber.

These and still further objects, features, and advantages of the present invention will become apparent upon consideration of the following detailed disclosure.

BRIEF SUMMARY OF THE INVENTION

The above and still further objects of the present invention are achieved, in accordance therewith, by providing a rotating disklike member having one or more, preferably a plurality of, apertures passing therethrough. Beneath the apertures is a porous support member which serves to hold a unit charge of toner in the aperture and to allow air, or other gas, to pass therethrough and entrain the toner material during the powder cloud generating operation. A supply of toner material is supported on the upper surface of the rotating disklike member and maintained in the proper position thereon by a metering blade which also acts to meter a uniform amount of powder into each aperture as the aperture moves beneath the powder supply and the metering blade. The metering blade is positioned to lightly scrape over the top surface of the rotating disklike member whereby each aperture, as it is presented beneath the metering blade, is uniformly and completely filled with a unit charge of toner material. After each aperture is loaded with toner, the disklike member is rotated into position beneath a pickup tube operatively coupled to aspiration nozzle means. Using the principle of aspiration, the unit charge of toner particles is withdrawn from the aperture as air is drawn through the porous support member by virtue of the flow of gaseous fluid through the aspiration nozzle. The entrained toner particles are aspirated into the pickup tube and blown into the development chamber by the gaseous fluid flowing through the aspiration nozzle. There is thereby created in the development chamber an aerosol of toner particles suitable for presentation to the image-bearing surface for development of the latent electrostatic image thereon. Since each aperture defines a unit charge of toner material, the development apparatus described herein is manifestly adapted for the accurate metering of toner material into the development chamber, whereby optimally developed images, such as required in xeroradiography, can be obtained.

BRIEF DESCRIPTION OF THE DRAWINGS

The nature of the invention will be more easily understood when it is considered in conjunction with the accompanying drawings wherein:

Referring to FIGS. 1 and 2, there is seen a powder cloud generating apparatus 10 adapted for the sequential presentation of unit quantities of powdered toner material to the image-bearing surface supported in a development chamber. Mounted on support member 12 is a vertical shaft 14 on which there is rotatably mounted bowl- or cuplike member 16 by means of sheath 18 which carries bearings and slips over shaft 14. In the embodiment as shown, cuplike member 16 is cylindrical having a side wall 20 and a bottom wall 22. As can best be seen in FIG. 1, bottom wall 22 has a plurality of regularly spaced apertures 24 therein, each aperture being spaced 45° apart from the nearest aperture on each side thereof. Beneath each aperture 24 is a porous support 26 maintained in position by retaining band 28 and screws 30 which serve to secure retaining band 28 to bottom wall 22. Retaining band 28 also has openings 32 therein such that when the retaining band is properly positioned openings 32 are aligned beneath apertures 24 in the upper portion of bottom wall 22. There is thus defined a cavity above porous support 26 into which a unit charge of toner material can be metered. Air flow drawn through opening 32, porous support 26, and aperture 24 during each aspiration cycle entrains the charge of toner material previously deposited into the cavity presented under the pickup means.

Figure 1:
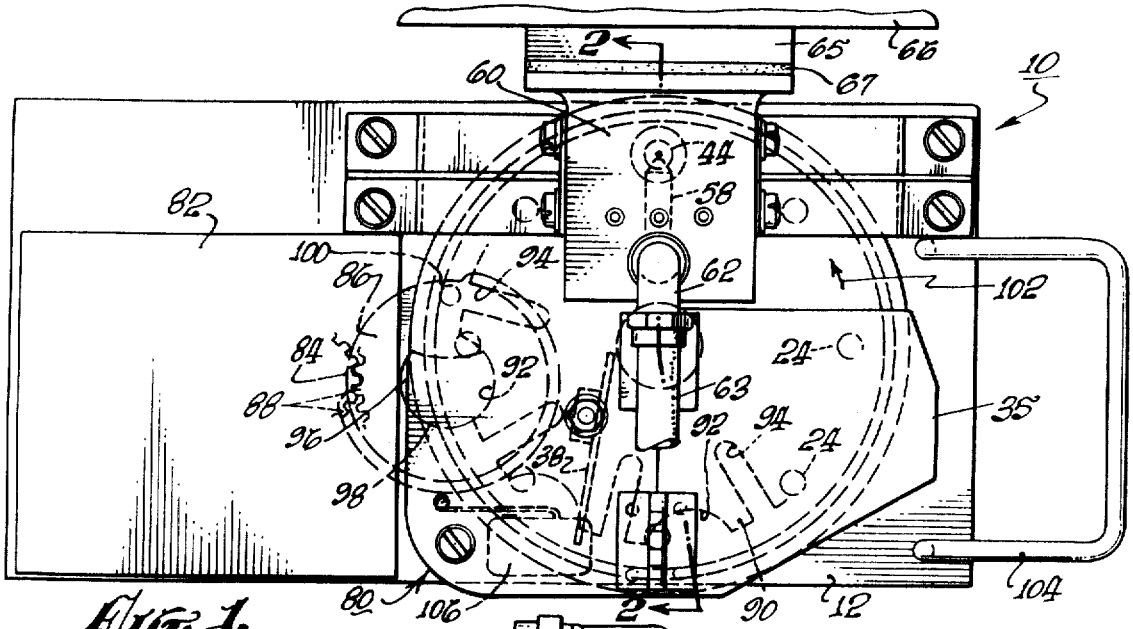
FIG. 1 is a top plan view of the powder cloud generating apparatus of the present invention.
Figure 2:
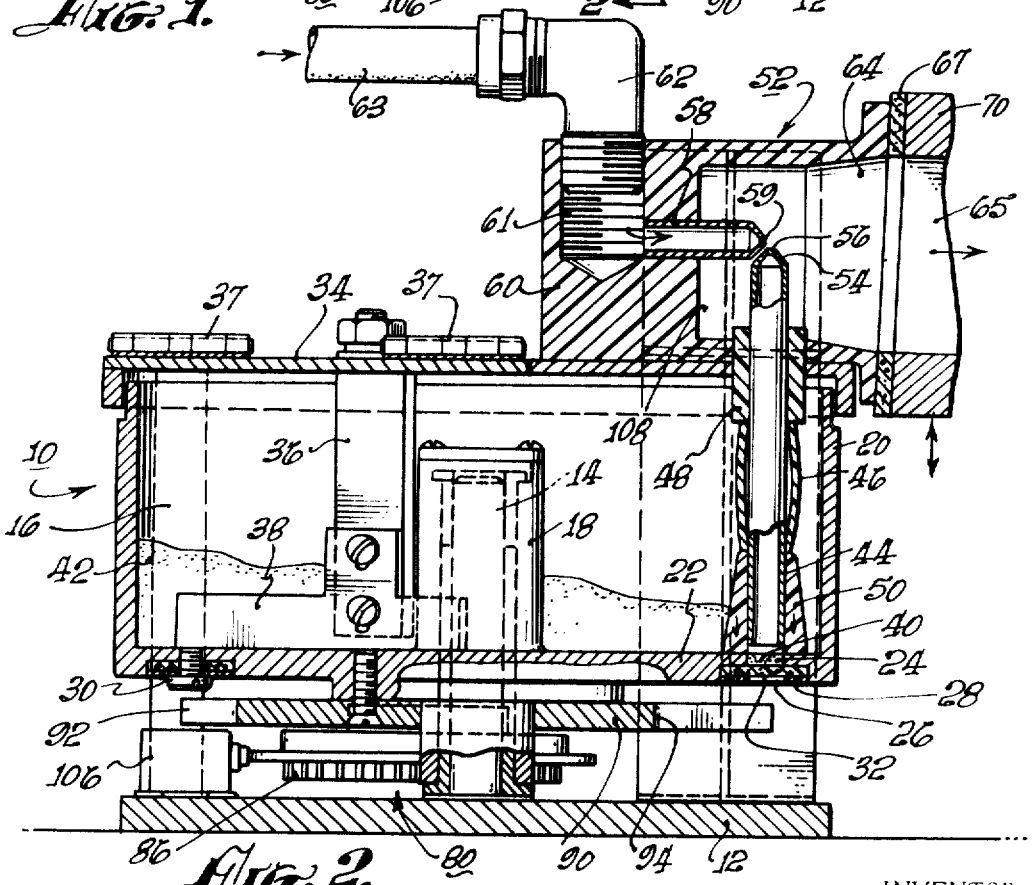
FIG. 2 is a longitudinal side-sectional view of the powder cloud generating apparatus of FIG. 1 taken along line 2—2.

Secured to top cover 34 is a downward extending arm 36 upon which there is positioned a doctor or metering blade 38 adapted to meter a unit charge 40 of toner 42 into each aperture 24 as cuplike member 16 is rotated beneath the supply of powdered toner material 42 and metering blade 38. The metering blade 38 is positioned to lightly scrape the top surface of bottom wall 22 so that each aperture 24 will be completely filled with toner material as the cuplike member is rotated past the metering blade. Upon further rotation of the cuplike member to the pickup station, a unit charge of toner will be presented for aspiration during the development operation to the development chamber.

Access to cuplike member 16, for the addition or removal of toner material, can be had through hinged cover portion 35 of cover 34. Hinged cover portion 35 is adapted for rotational movement about hinges 37.

At the pickup station, pickup tube 44 is positioned directly over an underlying, filled cavity in bottom wall 22. The diameter of the pickup tube is substantially equal to or somewhat greater than the diameter of the underlying aperture. Resilient tubing 46 positioned about pickup tube 44 and mounted against gasket 48, about the pickup tube as it passes through cover 34, urges lower gasket member 50, about the lower end of pickup tube 44, into slidable, frictional engagement with the upper surface of bottom wall 22. Gasket 50 ensures that only the unit charge 40 of toner in aperture 24 will be available for aspiration upon appropriate pulsation of the aspiration means.

Aspiration means 52 comprises pickup tube 44, the upper end of which is reduced in diameter, as at 54, to define a small opening 56 in the upper end thereof. At right angles to the upper end of pickup tube 44, and closely spaced therefrom, is aspiration tube 58 also having an opening 59 of reduced diameter at the downstream end thereof. Aspiration tube 58, mounted in housing 60, is connected by channel 61 in housing 60, elbow 62, and conduit 63 to a source of pressurized air, or other gas (not shown). As is well known, the rapid flow of gaseous fluid through aspiration tube 58 will cause a reduced pressure in pickup tube 44 by virtue of the proper positioning of the two tubes with respect to each other. This reduced presure will cause air or other gaseous fluid to be drawn into pickup tube 44 through opening 32 in retaining band 26, porous support 26, and aperture 24. The air or other gaseous fluid drawn into tube 44 will entrain the unit charge 40 of toner material in aperture 24. As the entrained toner material passes through opening 56 in the upper end of pickup tube 44, it will be blown through port 64 into the adjacent port 65 connected to, and adjacent, development chamber 66. Port 65 and port 64 are maintained in leak-tight engagement by means of compressible gasket 67 positioned therebetween.

A particular advantage of the present invention is that the aspiration system can be made to be self-cleaning. This is accomplished by causing the burst of pressurized gas through aspiration tube 58 to be somewhat longer than that necessary to entrain the unit charge 40 of toner material from aperture 24. Since there is no additional toner which can be drawn into pickup tube 44, the additional amount of air or other gaseous fluid drawn into the pickup tube serves to remove any toner particles remaining therein.

Although cuplike member 16 can be continuously rotated, it is presently preferred to have intermittent rotation which successively presents each aperture to the pickup station such that the unit charge of toner material therein can be withdrawn therefrom during the dwell period. The mechanism 80 for intermittently rotating cuplike member 16 includes motor 82 driving gear 84 which in turn drives cam 86 by means of teeth 88. Adjacent cam 86 is a Geneva wheel 90 having a plurality of arcuate outer surfaces 92, each of which is separated from the next arcuate surface by an intermediate slot 94. Cam 86 has a central locking member 96 having a curved surface 98 which is adapted to engage the arcuate outer surfaces 92 of the Geneva wheel 90. Cam 86 also includes a vertical actuating pin 100 which is movable into slots 94 thereby intermittently rotating the Geneva wheel. As is well known in the art, when actuating cam 86 is rotated by motor 82, actuating pin 100 will be shifted into a position in which it engages slot 94 in the Geneva wheel. With further rotation of the cam in the clockwise direction, the pin will slide into slot 94 and will intermittently step the Geneva wheel in the direction shown by arrow 102. The arcuate surface 92 of the Geneva wheel rides along the curved surface 98 of locking member 96 during the period after the withdrawal of the actuating pin 100 from the slot 94 and prior to insertion of the pin into the following slot. Thus, when the actuating pin moves out of engagement from a slot in the Geneva wheel, the curved surface 98 of the locking member will be constantly in engagement with the outer curved surface of the Geneva wheel, thus retaining the wheel in a locked position during what may be considered a dwell period. Therefore, it can readily be seen that continuous rotation of cam 86 permits the intermittent movement of Geneva wheel 90 and thus, the sequential presentation of each of the toner-containing apertures to the pickup station.

Although the powder cloud generating apparatus of the present invention can be adapted for use in conjunction with any powder cloud xerographic developing system, it has been particularly designed for use in conjunction with a development system wherein the development chamber is raised to seat against non-photoconductive portions of a xerographic plate to thereby define a leak-tight development chamber. Such a system is described, for example, in FIGS. 22 and 24 of application Ser. No. 874,834, filed Nov. 7, 1969, entitled "Automated Xerographic Processing System", and assigned to the assignee of the present invention. As described in said application, the development means includes a rigidly mounted backing plate positioned slightly above the path of xerographic plate travel through the development means. The development means also includes a development chamber 66 resting on inflatable elements. After a xerographic plate is properly positioned within the development means, the development means is raised by admission of pressurized gas to the inflatable elements whereby the upper portion of the development chamber is caused to seat against non-photoconductive portions of the xerographic plate whereby a leak-tight development chamber is defined. When the development means is in the raised position, port 65, adjacent development chamber 66, is in alignment with port 64 in aspiration means 52 whereby the cloud of toner particles can be admitted directly to the development chamber. In its uppermost position, a tight fit is maintained between aspiration means 52 and the development chamber 66 by means of gasket 67, previously described. After the development cycle is completed, the development chamber is lowered so the xerographic plate, with the xerographic powder image thereon, can be removed from the development means. The opposed surfaces of housing 60 adjacent port 64 and housing 70 adjacent port 65 are slanted slightly to the right whereby, when the development chamber is lowered, its movement will not be hindered by undesirable engagement of the adjacent surfaces.

Within the development chamber, and positioned approximately 1¼ inches from the photoconductive surface of xerographic plate, there is a grid electrode mounted on a support bracket. The grid electrode, which is biased oppositely from the polarity of the latent electrostatic image, is utilized to remove particles which have the same polarity as the latent electrostatic image and to establish field lines normal to the photoconductive surface whereby the phenomenon of edge depletion is substantially eliminated. When it is desired to produce an image having a "negative" sense, the grid electrode is biased to the same potential as the polarity of the latent electrostatic image, but its function remains the same as set forth above. After the xerographic plate, with the latent electrostatic image thereon, is properly positioned within the development means and the development chamber raised into the upper position where it is seated aaginst the xerographic plate to provide a leak-tight development chamber, the toner powder cloud generator is pulsed one or more times to fill the development chamber with a charge of toner particles. The powder cloud, charged by triboelectrification during the aspiration process, is admitted to the development chamber beneath the grid electrode. During each dwell period between successive toner pulsations, cuplike member 16 is rotated to present a new aperture, filled with a unit charge of toner material, for aspiration into the development chamber. Typically, pulsation of the toner feed mechanism is on the order of about 0.25–0.61 seconds. A microswitch 106 is provided to monitor each revolution of cam 86 and to deactuate motor 82 after one revolution of cam 86 has caused one index motion of the toner feed mechanism during any single or multi-pulsed development operation. Another pulse is initiated by a timer mechanism in the control system, after a quiescent period typically on the order of 2–5 seconds. In a multipulsed development operation, total development time can be, for example, on the order of about 40–60 seconds, depending upon the density required in the developed image. At the end of the development cycle, during which the latent electrostatic image has been made visible, unused or excess toner remaining suspended in the development chamber is withdrawn by purge means (not shown). At the end of the purge cycle, the inflatable elements are opened to the atmosphere, thereby causing the pressurized gas to be released therefrom whereby the development chamber is lowered from the leak-tight position under the combined influence of gravity and spring means (not shown). Thereafter, the xerographic plate bearing the electrostatically held powder image is withdrawn from the development chamber.

To complete the xerographic processing cycle, it is necessary to transfer the toner image from the photoconductive surface of the xerographic plate to a suitable support member. This is generally achieved by withdrawing a single suport sheet from a supply tray, transporting it to a point where it is in registration with the xerographic plate having the powder image thereon, transferring the powder image to the support sheet, and transporting the support sheet with the powder image thereon to fuser means from which the xerographic reproduction is advanced into a receiving tray. When using a non-reusable photoconductive element, the need to transfer the powder image to a further support surface is eliminated.

Handle 104 can be provided to manually insert or withdraw powder cloud generating apparatus 10 from its position within an automated xerographic processing system.

Optionally, fanning nozzles can be bored through housing 60 adjacent aspiration tube 58. These nozzles, which can be projected at oblique angles to the special intersection of the longitudinal axes of aspiration tube 58 and pickup tube 44, will assist in propelling the aspirated charge of toner material into the development chamber. Suitable air flow metering means can be provided in the bores through housing 60 to control the amount of air drawn through the fanning nozzles into port 64. This will not only permit greater aspiration control but additional means for preventing toner buildup in aspiration means 52, particularly chamber 108.

Although the present invention has been described with specific reference to a development apparatus suitable for use with xeroradiographically produced images, it should be understood that the apparatus can be utilized to develop latent electrostatic images irrespective of the manner in which they are created. Thus, the apparatus described herein can be utilized to develop line-copy latent electrostatic images, such as are produced in conventional photocopying equipment.

A pulsed development system can also be obtained through continuous rotation of the powder carrier means in combination with continuous air flow to aspirator tube 58. Rotation of the powder carrier means can be terminated after the required number of apertures have been emptied of the powdered toner material therein as they pass beneath pickup tube 44. The relationship of the diameters of the pickup tube and the cavity, in which the toner is deposited, should be carefully selected in this type of system to ensure that all toner is withdrawn from the cavity during entrainment.

While the invention has been described with reference to specific embodiments thereof, it will be understood by those skilled in the art that various changes may be made and equivalents may be substituted for elements thereof without departing from the true spirit and scope of the invention. For example, rather than providing a rotating cuplike member, the bulk toner material can be supported on a rotating disk which has the plurality of unit charge-defining apertures therethrough. The vertically positioned wall, serving to maintain the toner material in its proper location, will then be part of the adjacent stationary housing; however, this is not a presently prefered embodiment since the loss of toner through the gap defined by the adjacent disk and wall surfaces is generally undesirable. In addition, many modifications may be made to adapt a particular situation, material, or structural design, to the spirit of the present invention without departing from its essential teachings.

What is claimed is:

1. A powder cloud generator comprising:

a powder carrier having a plurality of apertures passing therethrough, a porous support beneath each of said apertures, said porous support and each of said apertures defining a plurality of cavities into which a metered amount of powder material can be deposited, means for applying a metered amount of said powder material into each of said defined cavities, means for entraining the metered powder material deposited in each cavity in a gaseous fluid passing through said porous support, said entraining means comprising a pickup tube positioned adjacent a cavity passing therebelow, means for continuously rotating said powder carrier whereby each cavity is sequentially subjected to said entraining means, and means for successively pulsing said entraining means each time a cavity having a metered amount of powder material therein passes below said pickup tube.

[2. A powder cloud generator comprising:

powder carrier means having at least one aperture passing therethrough, porous support means beneath each aperture, each aperture and its associated porous support means defining a cavity into which a unit charge of powdered material can be deposited.

means to meter a unit charge of powdered material into each defined cavity, aspirator means having its pickup end positioned adjacent the upper surface of each cavity as each cavity is positioned therebeneath, said aspirator means entraining the unit charge of powdered material deposited in said cavity by said metering means in a gaseous fluid drawn through said porous support means during the operation thereof, means for successively pulsing said aspirator means a plurality of times, and means during the period between successive pulses for rotating said powder carrier means to thereby position a cavity having powdered material therein beneath the pickup end of said aspirator means.]

[3. A powder cloud generator comprising:

a powder carrier having a plurality of apertures passing therethrough, a porous support beneath each of said apertures, each porous support and each of said apertures defining a plurality of cavities into which a metered amount of powdered material can be deposited, means for applying a metered amount of said powdered material into each of said cavities, means for entraining the metered powdered material deposited in each cavity in a gaseous fluid passing through said porous support, said entraining means comprising a pickup tube positioned adjacent a cavity passing therebelow, and means for intermittently rotating said powder carrier means, each aperture in said powder carrier means passing during rotation beneath said metering means and said entraining means, said intermittent rotation means positioning sequentially each cavity filled with powdered material beneath said pickup tube during the periods when said powder carrier means is not being rotated.]

[4. The powder cloud generator of claim 3 wherein said entraining means is successively pulsed each time a cavity having a metered amount of powder material therein passes below said pickup tube.]

[5. A powder cloud generator comprising:

powder carrier means having at least one aperture passing therethrough, porous support means beneath each aperture, each aperture and its associated porous support means defining a cavity into which a unit charge of powdered material can be deposited, means to meter a unit charge of powdered material into each defined cavity, aspirator means having its pickup end positioned adjacent the upper surface of each cavity as each cavity is positioned therebeneath, said aspirator means entraining the unit charge of powdered material deposited in said cavity by said metering means in a gaseous fluid drawn through said porous support means during the operation thereof, and means for intermittently rotating said powder carrier means, each aperture in said powder carrier means passing during rotation beneath said metering means and said aspirator means, said intermittent rotation means positioning sequentially each cavity filled with powdered material beneath said pickup end during the periods when said powder carrier means is not being rotated.]

[6. The powder cloud generator of claim 5 wherein said means for intermittently rotating said powder carrier means comprises Geneva wheel means.]

[7. A powder cloud generator comprising powder carrier means having at least one aperture passing therethrough; porous support means beneath each aperture; said porous support means and each aperture defining a cavity into which a unit charge of powdered material can be deposited; means to meter a unit charge of powdered material into each of said cavities; aspirator means including a pickup tube having a pickup and an output end, said pickup end positioned adjacent the upper surface of each cavity as each cavity is positioned therebeneath, an aspirator tube having an output end operatively positioned adjacent the output end of said pickup tube, the passage of a first gaseous fluid through said aspirator tube causing the unit charge of powdered material metered into said cavity to be entrained in a second gaseous fluid drawn through said porous support means and into said pickup tube, said entrained powdered material being drawn out of the output end of said pickup tube and blown, by continued flow of said first gaseous fluid through said aspirator tube, through a port adjacent the output ends of said aspirator and pickup tubes; and means for intermittently rotating said powder carrier means, each aperture in said powder carrier means passing sequentially during rotation beneath said metering means and said aspirator means, said intermittent rotation means sequentially positioning a cavity filled with powdered material beneath said aspiration means during the periods when said powder carrier means is not being rotated.]

[8. The powder cloud generator of claim 7 further including means for causing said first gaseous fluid to be passed through said aspirator tube for a period of time such that substantially all of the powdered material within the cavity positioned beneath said pickup tube is entrained, whereby said pickup tube is substantially cleaned of residual powdered material by the continued suction of said second gaseous fluid through said porous support means and said pickup tube.]

[9. The powder cloud generator of claim 7 further including gasket means disposed about the end of said pickup tube; and means to urge said gasket means and the end of said pickup tube into frictional engagement with that portion of the upper surface of said powder carrier means immediately adjacent that cavity positioned beneath said pickup tube; said frictional engagement serving to prevent the entrainment of powdered material from sources other that the cavity immediately beneath said pickup tube during aspiration.]

[10. The powder cloud generator of claim 7 wherein said means for intermittently rotating said powder carrier means comprises Geneva wheel means.]

References Cited

The following references, cited by the Examiner, are of record in the patented file of this patent or the original patent.

UNITED STATES PATENTS

| | | | |
|---|---|---|---|
| 1,935,977 | 11/1933 | Geer | 302—49 |
| 2,680,683 | 6/1954 | Obenshain | 222—194 |
| 2,712,963 | 7/1955 | Edwards | 302—49 |
| 3,260,408 | 7/1966 | Smitzer | 302—49 |
| 2,812,883 | 11/1957 | Hayford | 222—193 |
| 2,843,295 | 7/1958 | Ricker | 222—189 |

ROBERT B. REEVES, Primary Examiner

T. E. KOCOVSKY, Assistant Examiner

U.S. Cl. X.L.

222—Dig. 1; 302—49